United States Patent
Balraj et al.

(10) Patent No.: US 9,210,006 B2
(45) Date of Patent: Dec. 8, 2015

(54) METHOD FOR PROCESSING A DATA SIGNAL AND RECEIVER CIRCUIT

(75) Inventors: Rajarajan Balraj, Duesseldorf (DE);
Biljana Badic, Duesseldorf (DE);
Tobias Scholand, Muelheim (DE);
Thorsten Clevorn, Munich (DE)

(73) Assignee: Intel Deutschland GmbH, Neubiberg (DE)

(*) Notice: Subject to any disclaimer, the term of this patent is extended or adjusted under 35 U.S.C. 154(b) by 0 days.

(21) Appl. No.: 13/544,045

(22) Filed: Jul. 9, 2012

(65) Prior Publication Data

US 2014/0010275 A1    Jan. 9, 2014

(51) Int. Cl.
*H04B 1/10* (2006.01)
*H04L 25/03* (2006.01)

(52) U.S. Cl.
CPC ..... *H04L 25/03006* (2013.01); *H04L 25/03343* (2013.01); *H04L 25/03891* (2013.01); *H04L 2025/03414* (2013.01)

(58) Field of Classification Search
CPC . H04L 25/03343; H04B 7/0854; H04N 5/211
USPC .......................... 375/350, 348, 346
See application file for complete search history.

(56) References Cited

U.S. PATENT DOCUMENTS

| | | | | |
|---|---|---|---|---|
| 5,594,496 | A * | 1/1997 | Nielsen et al. | 348/21 |
| 5,841,484 | A * | 11/1998 | Hulyalkar et al. | 348/607 |
| 2005/0036575 | A1* | 2/2005 | Kuchi et al. | 375/348 |
| 2005/0281357 | A1* | 12/2005 | Bouvet et al. | 375/340 |
| 2009/0117862 | A1* | 5/2009 | Le Nir et al. | 455/101 |
| 2011/0085627 | A1* | 4/2011 | Kangas et al. | 375/346 |
| 2012/0033571 | A1* | 2/2012 | Shimezawa et al. | 370/252 |
| 2013/0044800 | A1* | 2/2013 | Ogawa et al. | 375/224 |

OTHER PUBLICATIONS

3GPP R1-093421. "Comparison of PMI-based and SCF-based MU-MIMO." TSG RAN1 Mtg. 58, Aug. 2009. 5 Pages.

* cited by examiner

*Primary Examiner* — Sam K Ahn
*Assistant Examiner* — Fabricio R Murillo Garcia
(74) *Attorney, Agent, or Firm* — Eschweiler & Associates, LLC

(57) ABSTRACT

A method includes receiving a signal including a co-channel interference, channel equalizing the received signal and processing the channel equalized signal based on a first precoding vector such that the co-channel interference is mitigated.

13 Claims, 7 Drawing Sheets

METHOD FOR PROCESSING A DATA SIGNAL AND RECEIVER CIRCUIT

FIELD

The invention relates to mobile communications. In particular, the invention relates to methods for processing a data signal and receiver circuits configured to perform such methods.

BACKGROUND

Signals transmitted in a radio communications system may be corrupted by the transmission channel and occurring interferences. Receiver circuits may process received signals in order to detect data that has originally been sent by a transmitter. Receiver circuits and methods performed by receiver circuits constantly have to be improved. In particular, it may be desirable to improve data detection in a receiver circuit.

BRIEF DESCRIPTION OF THE DRAWINGS

Aspects of the disclosure are made more evident by way of example in the following detailed description when read in conjunction with the attached drawing figures, wherein.

DETAILED DESCRIPTION

Figure 1:
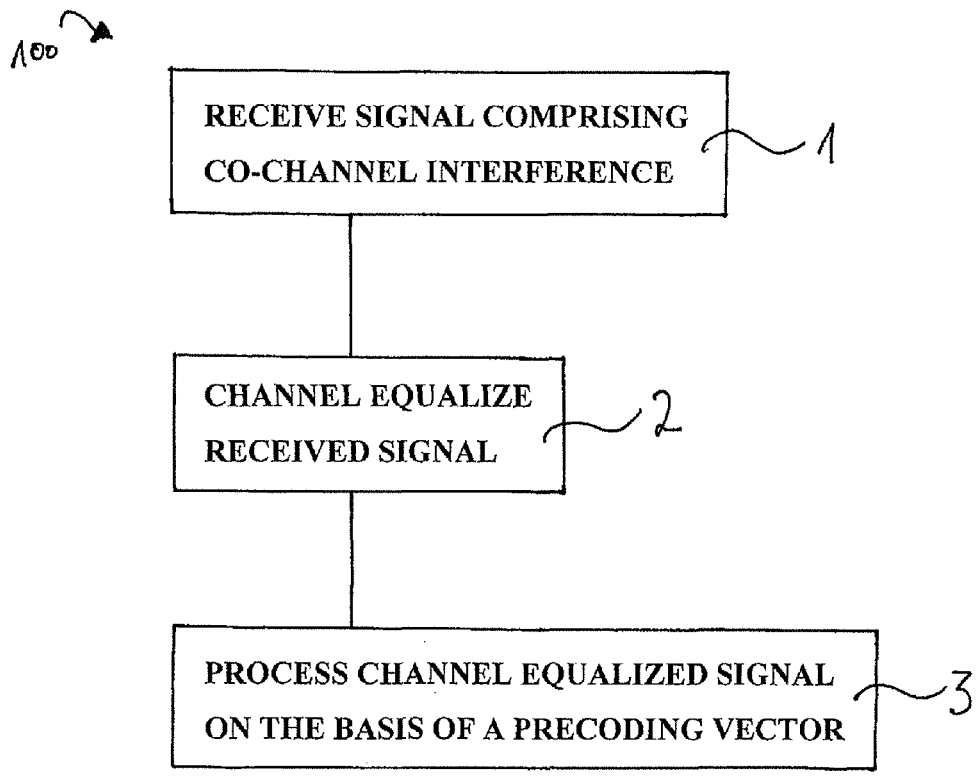
FIG. 1 is a schematic block diagram of a method 100 in accordance with the disclosure.

In the following detailed description, reference is made to the accompanying drawings, which form a part thereof, and in which are shown by way of illustration embodiments in which the disclosure may be practiced. It is understood that further embodiments may be utilized and structural or logical changes may be made without departing from the scope of the present disclosure. The features of the various exemplary embodiments described herein may be combined with each other, unless specifically noted otherwise. The following detailed description is therefore not to be taken in a limiting sense and the scope of the present disclosure is defined by the appended claims.

As employed in this specification, the terms "coupled" and/or "connected" are not meant to mean in general that elements must be directly coupled or connected together. Intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

Specified devices may be implemented in discrete circuits, partially integrated circuits or fully integrated circuits. In addition, devices in accordance with the disclosure may be implemented on a single semiconductor chip or on multiple semiconductor chips connected to each other. It is understood that components of the specified devices may be implemented in software or in dedicated hardware or partially in software and partially in dedicated hardware.

In the following, various methods in accordance with the disclosure are described. It is understood that each of the methods may be modified by adding further method steps. In particular, a method may be extended by one or more method steps described in connection with a respective other method. Additional method steps may also be derived by all further parts of this specification, unless specifically noted otherwise. It is further understood that specified features of individual methods may be combined in arbitrary ways resulting in further embodiments which are not explicitly described for the sake of simplicity.

Comments made in connection with a described method may also hold true for a corresponding receiver circuit configured to perform the method and vice versa. For example, if a specific method step is specified, a corresponding receiver circuit may include a unit to perform the described method step, even if such a unit is not explicitly described or illustrated in the figures.

The methods and devices described herein may be used in various wireless communication networks, e.g. Code Division Multiple Access (CDMA), Time Division Multiple Access (TDMA), Frequency Division Multiple Access (FDMA), Orthogonal FDMA (OFDMA), Single Carrier FDMA (SC-FDMA) networks, etc. Such radio communications systems (or networks or systems) may include a transmitter transmitting radio communications signals via radio communications channels. The transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver or a mobile station. By way of example, a mobile station may be represented by a cellular phone, a smartphone, a tablet PC, a laptop, etc. For example, the receiver circuits described herein may be a part of a mobile station such that the terms "mobile station" and "receiver circuit" may be used synonymously in the following. It is noted that a base station may also be referred to as "Node B" or "eNode B" and a mobile station may also be referred to as "User Equipment" (UE).

The methods and devices described herein may be operated according to a Multiple Input Multiple Output (MIMO) technique providing a use of multiple antennas at both, the transmitter and the receiver. It is understood that the described methods and devices may also be operated for the case of only one antenna at the receiver. MIMO is a part of wireless communications standards such as IEEE 802.11n (Wi-Fi), 4G, 3GPP Long Term Evolution (LTE), WiMAX and HSPA+. In this connection, the term "spatial-multiplexing" may be used which corresponds to a transmission technique in MIMO wireless communication and which may be used to transmit independent and separately encoded data signals, so-called streams, from each of the multiple transmit antennas of a base station. Similarly, a mobile station may receive multiple transmitted streams by means of a plurality of receive antennas. An encoding of data in spatial-multiplexing may be based on an open-loop approach or a closed-loop approach.

Multi-User (MU) MIMO schemes allow multiple mobile stations to share the same resource in frequency and time domains, i.e. same resource blocks, and multiplex their signals on the spatial domain. MU-MIMO may be regarded as an extended version of the Space-Division Multiple Access (SDMA) scheme. In 3G/HSPA MU-MIMO, the mobile stations may also share the same time and channelization code (e.g. Orthogonal Variable Spreading Factor (OVSF)/Spreading Code). For MU-MIMO, a base station may schedule multiple mobile stations for a data transmission. Transmission data is then transmitted from the base station to the scheduled mobile stations simultaneously. In particular, the signals dedicated to the respective mobile stations may correspond to respective directional data beams. During a data transmission, interferences between data streams transmitted from the base station to the co-scheduled mobile stations may occur. Such interference may be referred to as "co-channel" interference. Note that the terms "mobile station of interest" and "co-scheduled mobile station/interfering mobile station" as used in the following do not refer to an identical mobile station, but correspond to two different mobile stations of two different users.

The methods and devices described herein may utilize precoding weights, precoding vectors, precoding matrices, etc. In SU-MIMO systems, a precoding scheme may be based on weighting multiple data streams emitted from the transmit antennas of a base station with weights that may be chosen to maximize a signal power at the receiver output and thus the link throughput. In MU-MIMO systems, precoding weights may e.g. be chosen to maximize a sum capacity. MU-MIMO may be supported by codebook feedback based precoding or a dual-codebook approach. In practice, a precoding codebook including multiple predetermined precoding weights (or precoding vectors or precoding matrices) may be stored in a base station such that appropriate weights may be chosen from the codebook on the basis of channel information, for example CSI and/or a CQI. Alternatively, precoding weights may be determined by the base station at predetermined times and/or periodically.

Precoding vectors a and b are orthogonal with respect to each other when a scalar product between the vectors a and b equals zero. Scalar products may depend on a considered vector space and a representation of an element (or vector) of the vector space. A scalar product between two precoding vectors a and b may particularly correspond to an expression $a^H b$ wherein H denotes complex (or hermitian) conjugation. In a similar fashion, a scalar product between two precoding matrices A and B may particularly correspond to an expression $\text{trace}(A^H B)$ wherein the function $\text{trace}(\cdot)$ corresponds to a trace of its arguments which is a matrix.

FIG. 1 illustrates a method 100 in accordance with the disclosure including method steps 1 to 3. At method step 1, a signal that includes a co-channel interference is received. At method step 2, the received signal is channel equalized. At method step 3, the channel equalized signal is processed based on a first precoding vector such that the co-channel interference is mitigated.

Figure 2:
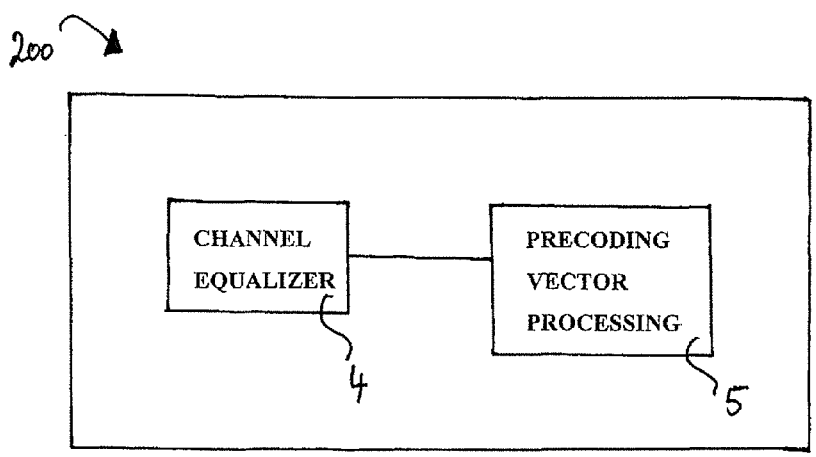
FIG. 2 is a schematic block diagram of a receiver circuit 200 in accordance with the disclosure.

FIG. 2 illustrates a receiver circuit 200 in accordance with the disclosure. An operation of the receiver circuit 200 may be read in connection with the method 100, but is not limited to this. The receiver circuit 200 includes a first unit 4 such as a channel equalizer that is configured to channel equalize a signal including a co-channel interference (see method step 2 of method 100). The second unit 5 such as a precoding vector processor is configured to process the channel equalized signal based on a precoding vector such that the co-channel interference is mitigated (see method step 3 of method 100).

The method 100 and the receiver circuit 200 as well as extensions thereof are described in the following. In this connection, further elements of the receiver circuit 200 may be specified which are not illustrated in the figures for the sake of simplicity. It is understood that the receiver circuit 200 may include one or more additional components configured to perform any method step described in this specification. Moreover, the receiver circuit 200 may also be configured to operate as a transmitter circuit. The receiver circuit 200 may further include one or more (electrical) connections between included components required to perform one or more of the described method steps.

An exemplary reference is now made to a MU-MIMO system in which a base station communicates with a number of K mobile stations simultaneously on the same time-frequency resource. It is noted that all comments made in this connection may also be applied to a corresponding SU-MIMO system. The base station may include an arbitrary number of $N_{tx}>1$ transmission antennas and each of the K mobile stations may include one or more reception antennas.

Precoded data x transmitted by the base station at an arbitrary time instant may be expressed by $$x = \frac{1}{\sqrt{K}} \sum_{i=1}^{K} w_i s_i. \tag{1}$$

Here, $w_i$ denotes a precoding vector of dimension $N_{tx} \times 1$ for the i-th mobile station which may be chosen from a precoding codebook having an arbitrary number of entries. In addition, $s_i$ denotes a (normalized) data symbol of a modulation alphabet employed by the base station for encoding the transmitted data for the i-th user. The precoded data x thus may correspond to a vector of dimension $N_{tx} \times 1$ including signals sent by the $N_{tx}$ transmission antennas of the base station. The vectors x and s may be normalized, respectively, i.e.

$$E[x^*x]=1 \tag{2}$$

and $$E[s^*s]=1 \tag{3}$$

wherein E denotes an expectation operator.

As can be seen from equation (1), the data x includes multiple signals dedicated to multiple mobile stations (or receiver circuits included therein), each of the signals being weighted with a respective precoding vector. The base station may provide each of the mobile stations with information about the respective precoding vector that has been used for precoding, e.g. via a control channel. In one embodiment, a channel for transmitting the data x may be assumed to be a single tap transmission channel in which a transmission of several symbols of the data x does not interfere with each other and thus may be handled individually. For example, a single tap channel may be supported by a Orthogonal Frequency Division Multiplexing (OFDM) based (radio) communications system.

It is noted that the data x of equation (1) may also be based on precoding matrices $w_i$. Each of such precoding matrices may have a dimension of $N_{tx} \times N_{layers}$ wherein the variable $N_{layers}$ denotes a number of layers that may be used by the base station for a mapping of data symbols.

A signal $y_1$ received by a mobile station of interest (or a receiver circuit 200 included therein) may be expressed by a vector $$y_1 = H_1 x + n \qquad (4)$$

of dimension $N_{rx} \times 1$. $N_{rx}$ denotes the number of receive antennas at the mobile station of interest, and $H_1$ denotes a channel matrix of dimension $N_{rx} \times N_{tx}$ which is assumed to be known or estimated at the mobile station of interest. In addition, n denotes noise, for example Additive White Gaussian Noise (AWGN) having a variance of $\sigma_r^2$.

From equations (1) and (4), it can be seen that a mobile station of interest does not exclusively receive signals that were dedicated to the mobile station of interest. Rather, a signal received by the mobile station of interest may include contributions from signals dedicated to co-scheduled mobile stations. These further contributions may e.g. be referred to as "co-channel interference". In this connection, it is further noted that signals included in the signal $y_1$ are not necessarily received from merely one radio cell (or one base station), but may include signals transmitted by base stations of different radio cells.

Combining equations (1) and (4), the received signal $y_1$ may be expressed by $$y_1 = \frac{1}{\sqrt{K}} H_1 \sum_{i=1}^{K} w_i s_i + n \qquad (5)$$

or $$y_1 = \frac{1}{\sqrt{K}} H_1 w_1 s_1 + \frac{1}{\sqrt{K}} H_1 \sum_{i=2}^{K} w_i s_i + n. \qquad (6)$$

Following equation (6), the received signal $y_1$ may further be written as $$y_1 = \frac{1}{\sqrt{K}} (H_1 w_1 s_1 + \ldots + H_1 w_i s_i) + n \qquad (7)$$

or $$y_1 = \frac{1}{\sqrt{K}} H_1 (w_1 s_1 + \ldots + w_i s_i) + n. \qquad (8)$$

The mobile station of interest may receive the signal $y_1$ in a radio frequency range via one or more of its reception antennas which may be coupled to one or more antenna ports of the receiver circuit 200, respectively. The received signal $y_1$ may be down-converted from a radio frequency band to an intermediate band or a baseband using a down-conversion mixer (not shown). The down-converted analogue data may be converted to the digital domain by an Analog-to-Digital Converter (ADC) (not shown). The digital data may be forwarded to the first unit 4 of the receiver circuit 200. It is understood that further components may be arranged between the antenna ports and the first unit 4, for example a delay profile estimator, a channel estimator, filters, etc.

The first unit 4 may receive digital data and may perform method step 2 of method 100 such that data input to the first unit 4 is channel equalized. The channel equalization is not restricted to a specific equalization scheme. For example, the equalization performed by the first unit 4 may be linear or non-linear. In particular, the equalization may be based on at least one of the following schemes: Minimum Mean Square Error (MMSE), Zero Forcing (ZF), Maximum Ratio Combining (MRC) and Matched Filter Maximum Ratio Combining (MF-MRC).

In the following, an exemplary channel equalization based on an MMSE scheme is described. The scheme may particularly be based on a channel equalization matrix $$G = (H_1^H H_1 + \sigma_r^2 I)^{-1} H_1^H \qquad (9)$$

wherein I denotes a unity matrix. The channel matrix $H_1$ may be determined by a channel estimator (not shown) using e.g. pilot signals. The channel equalization of the received signal $y_1$ according to the MMSE scheme may be performed by applying the equalization matrix G to the received signal $y_1$ (or the signal input to the first unit 4), i.e.

$$z = G \cdot y_1 \qquad (10)$$

or $$z = (H_1^H H_1 + \sigma_r^2 I)^{-1} (H_1^H \cdot y_1). \qquad (11)$$

The channel equalized vector z may have the form of the precoded symbol x after precoding at the base station (see equation (1)). Hence, the channel equalized vector z may be expressed by $$z \approx \frac{1}{\sqrt{K}} (w_1 s_1 + \ldots w_i s_i) + n^*, \qquad (12)$$

wherein n* denotes a thermal and interference noise at the output of the first unit 4. The noise n* may be written as $$n^* = Gn \qquad (13)$$

From equation (12) it becomes apparent that the channel equalized signal z includes contributions of i channel equalized signals that are based on the respective i signals of e.g. equation (5). It is noted that a channel equalization according to equations (10) and (11) does not require computing an effective channel matrix $$h_{eff} = \frac{1}{\sqrt{K}} H_1 w_1. \qquad (14)$$

The channel equalized signal z may be forwarded to the second unit 5 of the receiver circuit 200 in order to perform method step 3 of method 100. For example, performing method step 3 may include multiplying the channel equalized signal z by the precoding vector that has been used by the base station for precoding signals dedicated to the mobile station of interest. The method step 3 may thus be expressed by $$\hat{s}_1 = \sqrt{K} \cdot w_1^H \cdot z. \qquad (15)$$

It is noted that the method step 3 may particularly depend on the precoding scheme that has been applied by the base station. If precoding matrices were used for precoding, the channel equalized signal z may particularly be multiplied by the corresponding precoding matrix that has been used to precode the signal dedicated to the mobile station of interest.

The precoding vectors $w_i$ of equation (1) are orthogonal (or substantially orthogonal) with respect to each other and may particularly be normalized. That is, $$w_i^H w_j = \delta_{i,j} \qquad (16)$$

wherein $\delta_{i,j}$ denotes a Kronecker delta. Hence, for $i \neq 1$, a corresponding multiplication (substantially) becomes zero, i.e.

$$w_1^H w_i \approx 0 \qquad (17)$$

The signal resulting from such multiplication according to equation (15) thus becomes $$\hat{s}_1 \approx s_1 + n^*. \qquad (18)$$

The signal $\hat{s}_1$ may optionally be processed by applying an equalization bias to it. In an optional further method step, a bias matrix may be determined according to $$B = G \cdot H_1. \qquad (19)$$

An equalization bias (or residual interference) e may be determined in a further optional method step according to $$e = w_1^H \cdot B \cdot w_1 \qquad (20)$$

wherein the equalization bias e may particularly be a scalar value. In a further optional method step, the equalization bias of equation (20) may be applied to the signal $\hat{s}_1$ according to $$\hat{s}_1 \approx e(s_1 + n^*). \qquad (21)$$

In a further optional method step, Log Likelihood Ratio (LLR) values may be computed on the basis of the signal $\hat{s}_1$ of equation (21).

It is understood that, depending on whether the equalization bias is applied or not, the respective signal $\hat{s}_1$ of equation (18) or equation (21) may be processed by further components of the receiver circuit 200 or components connected to the receiver circuit 200. For example, the signal $\hat{s}_1$ may be processed by a despreader, a descrambler, a digital signal processor, a decoder, etc.

It is noted that performing the method 100 does not require estimating an interference covariance matrix. In addition, the method 100 may particularly be applied for the case $N_{rx} \geq N_{tx}$ wherein $G \cdot H \approx I$. It is noted that the case $N_{rx} < N_{tx}$ may result in an undetermined system wherein $G \cdot H \neq I$. In addition, the method 100 may be particularly applied for the case of high values of the Signal to Noise Ratio, since the noise term $n^*$ of equation (18) may then be neglected.

Figure 3:
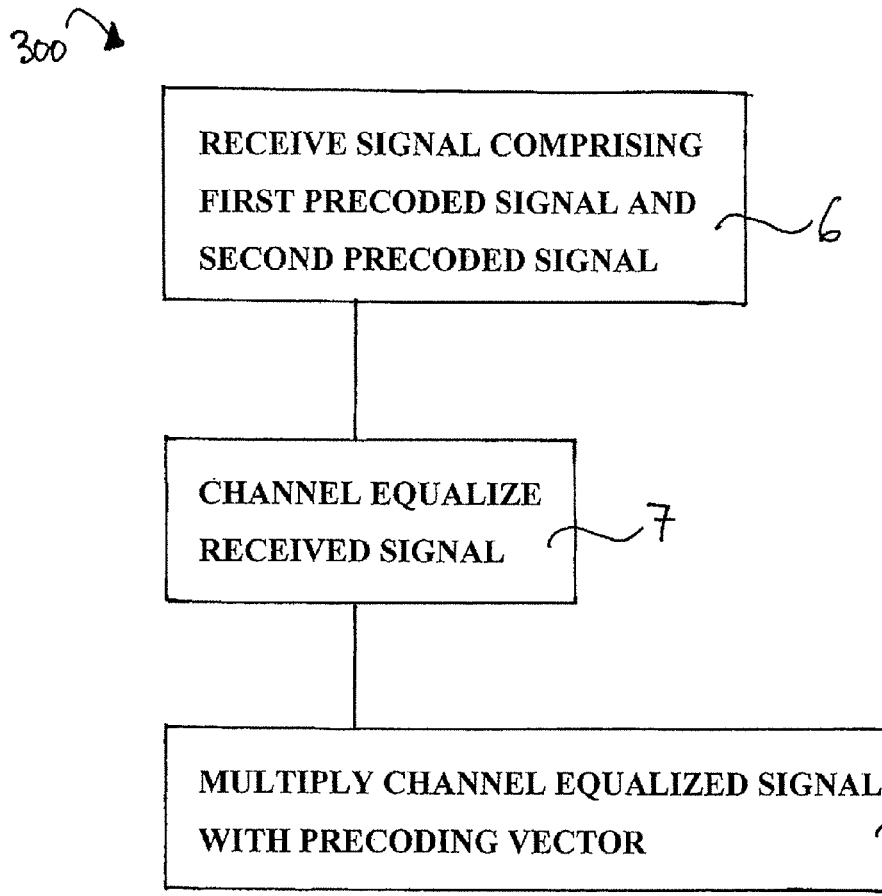
FIG. 3 is a schematic block diagram of a method 300 in accordance with the disclosure.

FIG. 3 illustrates a method 300 in accordance with the disclosure. All comments made in connection with the method 100 may also hold true for the method 300. At a method step 6, a signal is received at a first receiver circuit, the received signal including a first signal dedicated to the first receiver circuit and a second signal dedicated to a second receiver circuit wherein the first signal is precoded on the basis of a first precoding vector and the second signal is precoded on the basis of a second precoding vector which is substantially orthogonal to the first precoding vector. At a method step 7, the received signal is channel equalized. At a method step 8, the channel equalized signal is multiplied with the first precoding vector.

Figure 4:
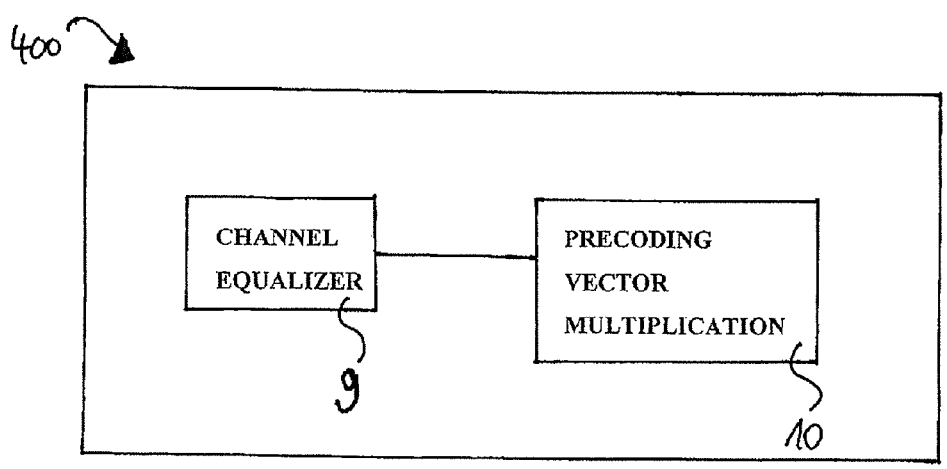
FIG. 4 is a schematic block diagram of a receiver circuit 400 in accordance with the disclosure.

FIG. 4 illustrates a receiver circuit 400 in accordance with the disclosure. An operation of the receiver circuit 400 may be read in connection with the method 300 of FIG. 3, but is not limited to this. The receiver circuit 400 is configured to receive a signal wherein the received signal includes a first signal dedicated to a first receiver circuit and a second signal dedicated to a second receiver circuit wherein the first signal is precoded on the basis of a first precoding vector and the second signal is precoded on the basis of a second precoding vector which is substantially orthogonal to the first precoding vector (see method step 6 of FIG. 3). The receiver circuit 400 includes a unit 9 such as a channel equalizer configured to channel equalize the received signal (see method step 7 of FIG. 3). In addition, the receiver circuit 400 includes a unit 10 such as a precoding vector multiplication unit configured to multiply the channel equalized signal with the first precoding vector (see method step 8 of FIG. 3). It is understood that comments made in connection with the receiver circuit 200 of FIG. 2 may also hold true for the receiver circuit 400.

Figure 5:
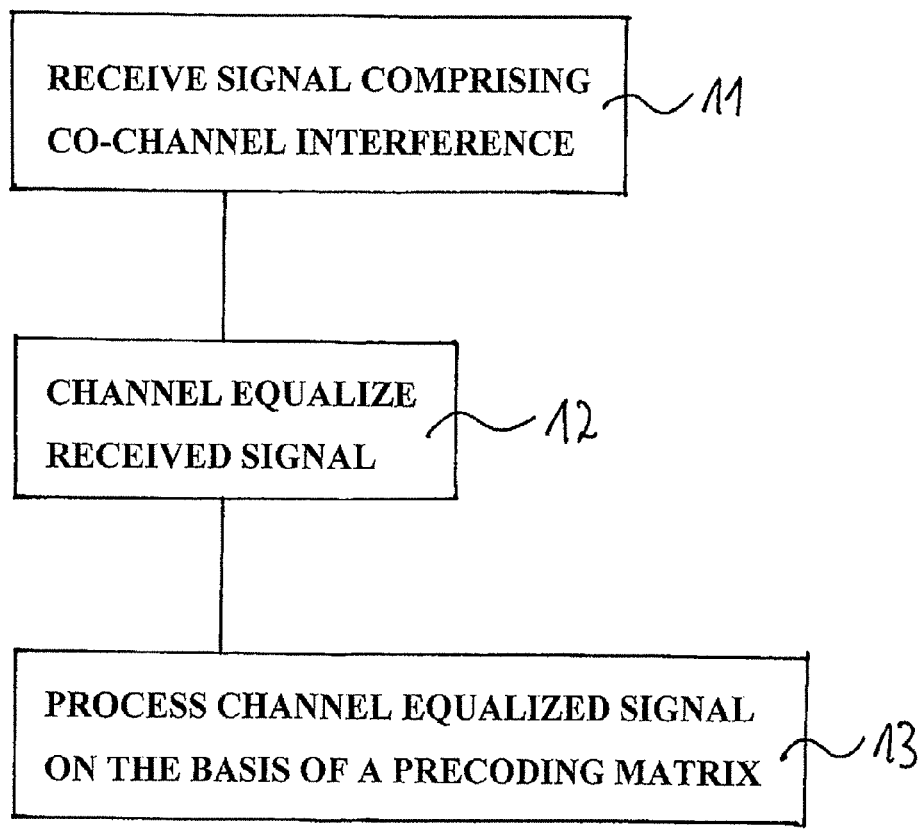
FIG. 5 is a schematic block diagram of a method 500 in accordance with the disclosure.

FIG. 5 illustrates a method 500 in accordance with the disclosure. All comments made in connection with the method 100 may also hold true for the method 500. At a method step 11, a signal including a co-channel interference is received. At a method step 12, the received signal is channel equalized. At a method step 13, the channel equalized signal is processed on the basis of a first precoding matrix such that the co-channel interference is mitigated.

Figure 8A:
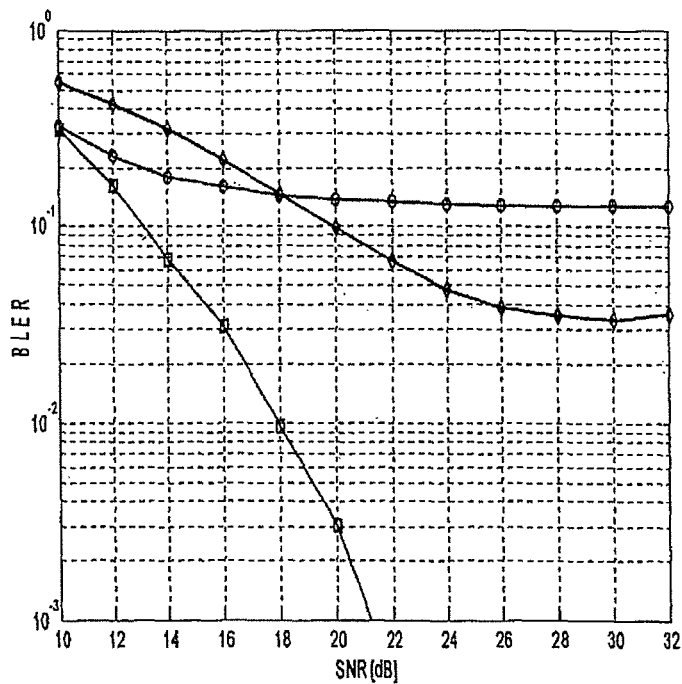
FIGS. 8A and 8B are graphs that illustrate the performance of receiver circuits.
Figure 8B:
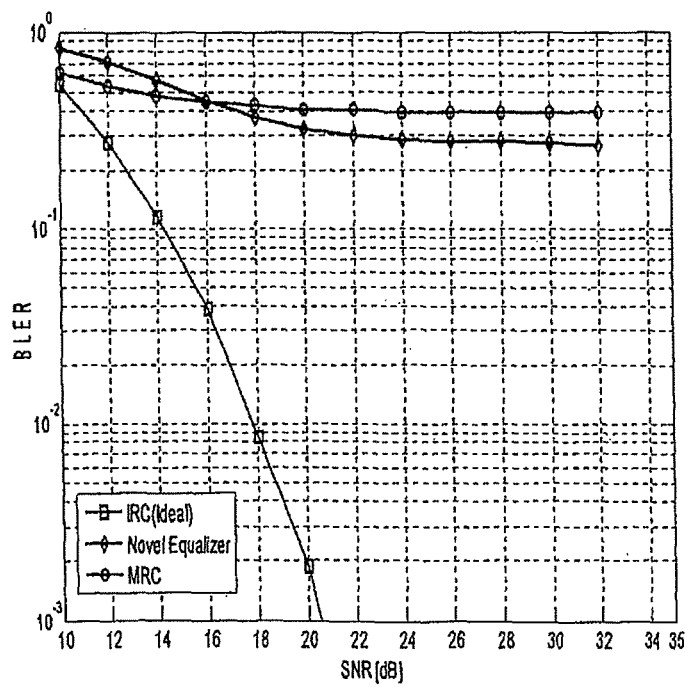
Figure 9A:
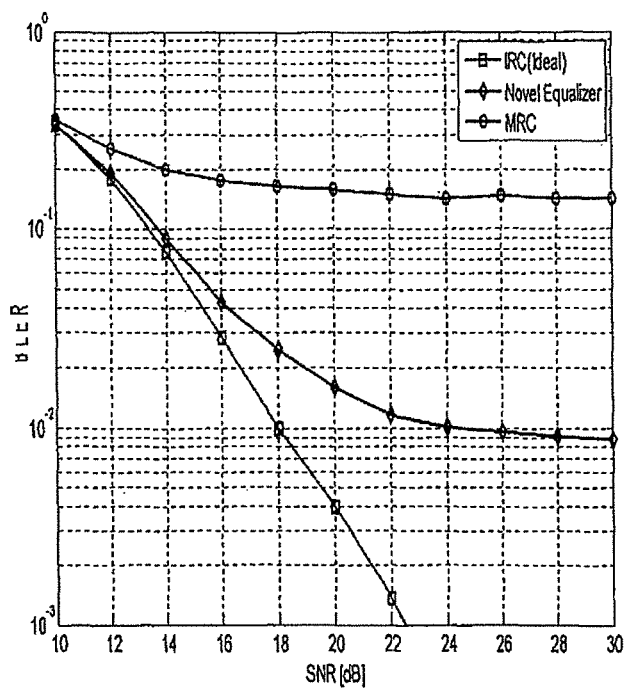
FIGS. 9A and 9B are graphs that illustrate the performance of receiver circuits.
Figure 9B:
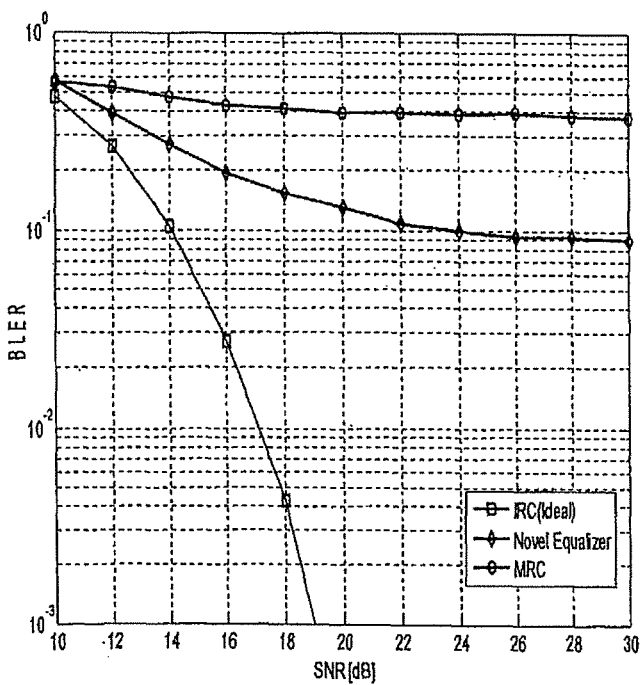

FIGS. 6A to 9B are graphs that schematically illustrate performances of various receiver circuits including different types of equalizers. In each of FIGS. 6A to 9B, a Block Error Rate (BLER) is plotted against an average SNR in dB. In addition, for each of FIGS. 6A to 9B lines including small circles illustrate a performance of a receiver circuit including an interference unaware Maximum Ration Combiner (see "MRC") while lines including small squares illustrate a performance of a receiver circuit including an Interference Rejection Combiner (see "IRC"). For the IRC it is assumed that a required channel covariance matrix is known. It is understood that in a practical scenario such (ideal) IRC may be impossible due to high estimation errors. Lines including small diamonds illustrate a performance of a receiver circuit performing one of the methods in accordance with the disclosure (see "Novel linear equalizer"). In FIGS. 9A and 9B the novel linear equalizer additionally takes into account an equalization bias according to e.g. equation (21).

Figure 6A:
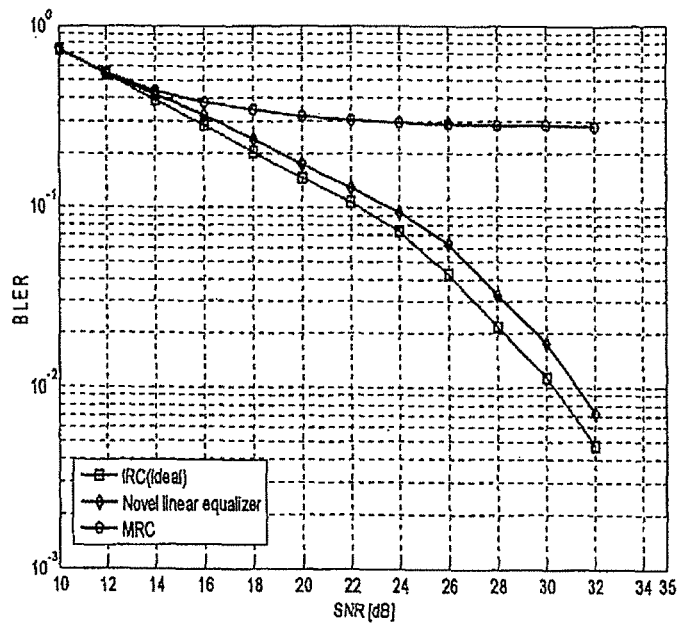
FIGS. 6A and 6B are graphs that illustrate the performance of receiver circuits.
Figure 6B:
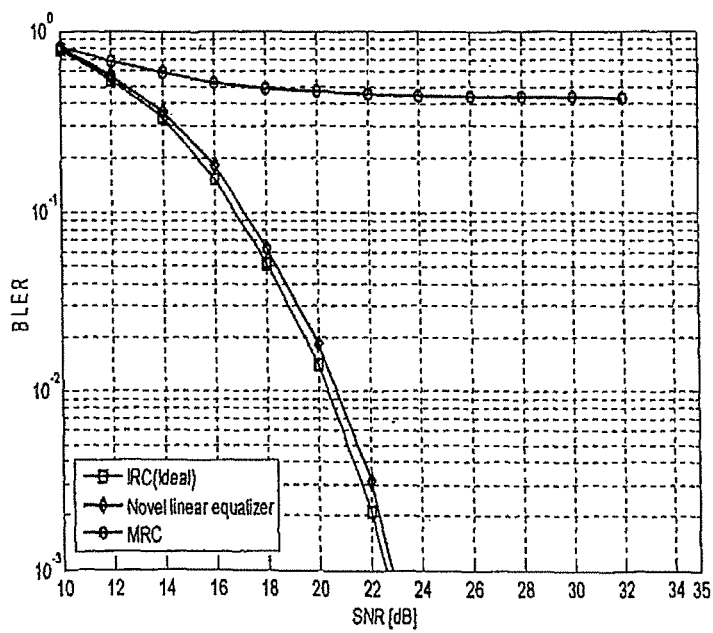

Each of FIGS. 6A and 6B relates to an employed 64-QAM modulation scheme, a cancellation ratio CR of 0.5, a number of transmit antennas $N_{tx}=2$ and a number of reception antennas $N_{rx}=2$. FIG. 6A is related to an urban-micro scenario, i.e. a low spatial correlation, while FIG. 6B is related to an urban-macro scenario, i.e. a high spatial correlation. Note that such scenarios are e.g. known from 3GPP specifications.

Figure 7A:
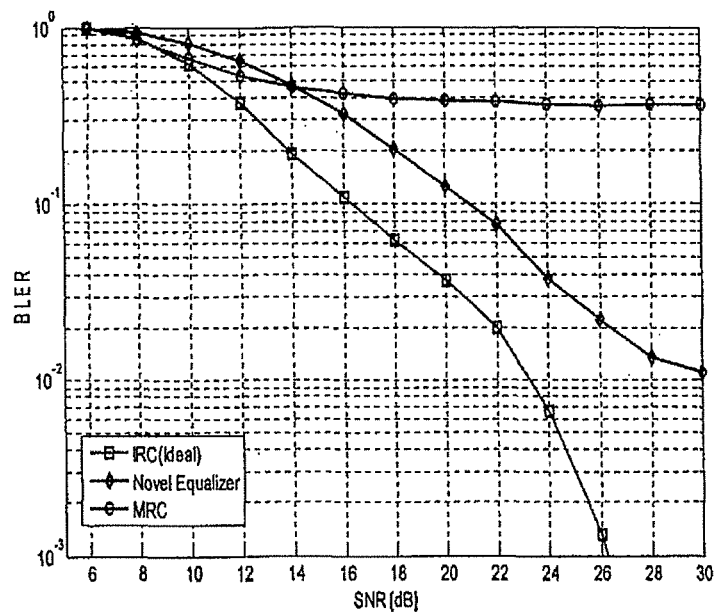
FIGS. 7A and 7B are graphs that illustrate the performance of receiver circuits.
Figure 7B:
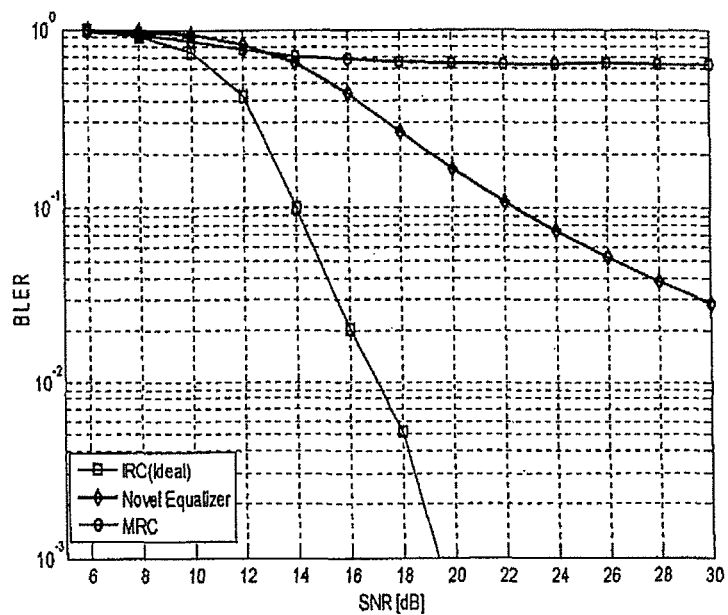

Each of FIGS. 7A and 7B relates to an employed 64-QAM modulation scheme, a cancellation ratio CR of 0.75, a number of transmit antennas $N_{tx}=4$ and a number of reception antennas $N_{rx}=4$. FIG. 7A is related to an urban-micro scenario while FIG. 7B is related to an urban-macro scenario.

Each of FIGS. 8A and 8B relates to an employed 64-QAM modulation scheme, a cancellation ratio CR of 0.5, a number of transmit antennas $N_{tx}=4$ and a number of reception antennas $N_{rx}=2$. FIG. 8A is related to an urban-micro scenario while FIG. 8B is related to an urban-macro scenario.

Each of FIGS. 9A and 9B relates to an employed 64-QAM modulation scheme, a cancellation ratio CR of 0.5, a number of transmit antennas $N_{tx}=4$ and a number of reception antennas $N_{rx}=2$. FIG. 9A is related to an urban-micro scenario while FIG. 9B is related to an urban-macro scenario.

From FIGS. 6A, 6B, 7A and 7B, it can be seen that, for the case of $N_{rx} \geq N_{tx}$, a receiver circuit performing a method in accordance with the disclosure outperforms the MRC for a 2×2 antenna configuration as well as a 4×4 antenna configuration. For a 2×2 antenna configuration and a low channel correlation, the performance of the receiver circuit in accordance with the disclosure is almost comparable to the performance of the ideal IRC (see FIG. 6B). The gain is reduced by ~0.5 dB in high spatially correlated channels (see FIG. 6A). This gain is considerably reduced for the case of a 4×4 antenna configuration. It is noted that the gap between these two estimation methods may particularly be based on a lack of interference covariance estimation.

From FIGS. 8A and 8B, it can be seen that the case of $N_{rx}<N_{tx}$ may result in a performance deterioration of a receiver circuit in accordance with the disclosure. An error flow may be reduced in comparison with the MRC receiver. This may be based on the fact that a receiver circuit in accordance with the disclosure does not take into the account properties of an effective channel matrix $h_{eff}$.

The performance of the receiver circuit in accordance with the disclosure accounting for a bias reduction is shown in FIGS. 9A and 9B for the case of $N_{rx}<N_{tx}$. It can be seen that an error floor may be significantly reduced, in particular for an urban-macro scenario. It is noted that an equalization bias can be applied for all antenna configurations which may improve the overall equalizer performance.

While the invention has been illustrated and described with respect to one or more implementations, alterations and/or modifications may be made to the illustrated examples without departing from the spirit and scope of the appended claims. Also, techniques, systems, subsystems and methods described and illustrated in the various embodiments may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
receiving, by a receiver circuit, a signal comprising a co-channel interference, wherein at least a part of the received signal is precoded based on a first precoding vector;
channel equalizing, by a channel equalizer, the received signal;
processing, by a precoding vector processor, the channel equalized signal by multiplying the channel equalized signal with the first precoding vector and a factor related to a number of mobile stations with which a base station communicates concurrently over a same time-frequency resource, wherein the co-channel interference is mitigated;
estimating, by the precoding vector processor, an equalization bias by:
determining a bias matrix based on a channel equalization matrix and a channel matrix;
multiplying the bias matrix with the first precoding vector and the complex conjugate of the first precoding vector; and
applying the equalization bias to the processed signal;
wherein applying the equalization bias to the processed signal comprises multiplying the processed signal with the equalization bias.

2. The method of claim 1, wherein channel equalizing the received signal is based on at least one of a Minimum Mean Square Error scheme, a Zero Forcing scheme, a Maximum Ratio Combining scheme and a Matched Filter Maximum Ratio Combining scheme.

3. The method of claim 1, wherein:
the received signal is received at a first receiver circuit;
the received signal comprises a first signal dedicated to the first receiver circuit and a second signal dedicated to a second, different receiver circuit; and
the first signal is precoded based on the first precoding vector and the second signal is precoded based on a second precoding vector that is substantially orthogonal to the first precoding vector.

4. The method of claim 3, wherein:
the first receiver circuit is comprised by a first mobile station; and
the second receiver circuit is comprised by a second, different mobile station.

5. The method of claim 3, wherein:
the channel equalized signal comprises a first channel equalized signal based on the first signal and a second channel equalized signal based on the second signal; and
mitigating the co-channel interference comprises removing the second channel equalized signal from the channel equalized signal.

6. The method of claim 3, wherein the first signal and the second signal are transmitted by a base station simultaneously on a same time-frequency resource.

7. The method of claim 3, wherein the first signal and the second signal are transmitted by a base station simultaneously on a same time and channelization/spreading code.

8. The method of claim 3, wherein the first signal comprises a first directional data beam and the second signal comprises a second directional data beam.

9. The method of claim 1, wherein the received signal comprises first data transmitted from a first radio cell and second data transmitted from a second, different radio cell.

10. The method of claim 1, wherein the received signal is received based on a Multi-User Multiple-Input Multiple-Output technology.

11. The method of claim 1, wherein the received signal comprises Orthogonal Frequency Division Multiplexed data.

12. The method of claim 1, further comprising:
calculating Log Likelihood Ratio values based on the equalization bias and the processed signal.

13. A method, comprising:
receiving a signal at a first receiver circuit, the received signal comprising a first signal dedicated to the first receiver circuit and a second signal dedicated to a second, different receiver circuit, wherein the first signal is precoded based on a first precoding vector and the second signal is precoded on the basis of a second precoding vector which is substantially orthogonal to the first precoding vector;
channel equalizing, by a channel equalizer, the received signal;
multiplying the channel equalized signal with the first precoding vector and a factor related to a number of mobile stations with which a base station communicates concurrently over a same time-frequency resource using a precoding vector processor;
estimating, by the precoding vector processor, an equalization bias by:
determining a bias matrix based on a channel equalization matrix and a channel matrix;
multiplying the bias matrix with the first precoding vector and the complex conjugate of the first precoding vector; and
applying the equalization bias to the processed signal;
wherein applying the equalization bias to the processed signal comprises multiplying the processed signal with the equalization bias.

* * * * *